(12) United States Patent
Borsarelli et al.

(10) Patent No.: US 7,325,668 B2
(45) Date of Patent: Feb. 5, 2008

(54) TRANSFER UNIT FOR TRANSFERRING GLASS ARTICLES

(75) Inventors: Gianclaudio Borsarelli, Cuneo (IT); Paolo Gianti, Busca (IT); Carlo Sesia, Cuneo (IT); Bruno Viada, Madonna Delle Grazie (IT)

(73) Assignee: Bottero S.p.A. (IT)

( * ) Notice: Subject to any disclaimer, the term of this patent is extended or adjusted under 35 U.S.C. 154(b) by 130 days.

(21) Appl. No.: 11/206,620

(22) Filed: Aug. 18, 2005

(65) Prior Publication Data

US 2006/0037842 A1 Feb. 23, 2006

(30) Foreign Application Priority Data

Aug. 18, 2004 (IT) .......................... TO2004A0571

(51) Int. Cl.
*B65G 47/26* (2006.01)
(52) U.S. Cl. ...................... 198/430; 198/468.1; 901/15; 65/260
(58) Field of Classification Search ............. 198/468.1, 198/429, 430, 431, 432, 433; 901/15; 65/239, 65/240, 241, 260
See application file for complete search history.

(56) References Cited

U.S. PATENT DOCUMENTS

| | | | |
|---|---|---|---|
| 3,583,862 A | 6/1971 | Stacey | |
| 3,853,213 A * | 12/1974 | Lehman et al. | 198/597 |
| 4,830,653 A | 5/1989 | Montemayor-Quiroga et al. | |
| 5,037,466 A * | 8/1991 | Voisine et al. | 65/260 |
| 5,429,651 A * | 7/1995 | Bolin | 198/430 |
| 6,494,063 B1 * | 12/2002 | Malek | 198/468.1 |
| 6,893,204 B1 * | 5/2005 | Suzuki et al. | 901/15 |

FOREIGN PATENT DOCUMENTS

| | | |
|---|---|---|
| DE | 10 2004 007 507 A1 | 9/2005 |
| EP | 0 879 795 A2 | 11/1988 |
| EP | 0 457 420 A1 | 11/1991 |
| EP | 1 134 198 A1 | 9/2001 |
| EP | 1 571 130 A2 | 1/2005 |
| EP | 1 577 272 A2 | 1/2005 |
| EP | 1 577 271 A2 | 9/2005 |
| WO | WO 2005/085145 A1 | 9/2005 |

OTHER PUBLICATIONS

Search Report issued Nov. 16, 2005 by European Patent Office in connection with corresponding application No. EP 05 10 7443.

* cited by examiner

*Primary Examiner*—James R. Bidwell
(74) *Attorney, Agent, or Firm*—Ostrolenk, Faber, Gerb & Soffen, LLP

(57) ABSTRACT

In a transfer unit for transferring glass articles from a supporting surface to a carry-off conveyor, a pickup member, for engaging the articles for transfer, is moved between a pickup position and a release position by an actuating device having a single articulated arm, and two electric motors activated independently to move the pickup member with respect to the articulated arm, and to move different portions of the articulated arm with respect to one another.

8 Claims, 3 Drawing Sheets

TRANSFER UNIT FOR TRANSFERRING GLASS ARTICLES

The present invention relates to a transfer unit for transferring glass articles.

BACKGROUND OF THE INVENTION

As is known, hollow glass articles are formed in aligned, adjacent molds, and, once molded, are extracted from the respective molds and placed on a supporting surface, from which they are subsequently transferred onto a linear conveyor which feeds them successively to an output of the system.

The glass articles are transferred from the supporting surface to the linear conveyor by means of transfer units, each of which comprises a pickup member for engaging one or more articles to be transferred; a pneumatic linear actuator for moving the pickup member horizontally to and from the glass articles; and an angular actuator, normally defined by an electric motor, for rotating the linear actuator and the pickup member, about a vertical hinge axis, between a pickup position, to pick the articles off the supporting surface, and a release position, to release the articles onto the linear conveyor.

With the increase in the output rate of molding systems, known transfer units of the type described above have proved increasingly unsatisfactory and unreliable. This is mainly due to the presence of pneumatic actuators, which fail to provide for precise, repeat control of the position and travelling trajectory of the pickup member, which is essential for preventing damage to the articles, particularly when, again for reasons of output rate, the articles must be transferred at relatively high speed onto the conveyor to form two parallel lines of articles. Unlike single-file positioning, two-line positioning on the conveyor belt calls for at least one dedicated transfer unit differing in size and construction from the other units.

Regardless of construction characteristics, known transfer units invariably comprise at least one pneumatic actuator located above the surface supporting the articles for transfer, adjacent to the articles themselves, and therefore operating in a hot environment, so that the units call for continual, constant routine maintenance.

SUMMARY OF THE INVENTION

It is an object of the present invention to provide a transfer unit designed to provide a straightforward, low-cost solution to the above problems, and which, at the same time, is compact and cheap and easy to produce.

According to the present invention, there is provided a transfer unit for transferring glass articles from a supporting surface to a carry-off conveyor; the unit comprising a fixed support, a pickup member for engaging the articles for transfer, and actuating means for activating said pickup member; characterized in that said actuating means comprise a single articulated arm, in turn comprising a first elongated portion hinged to said fixed support to rotate about a fixed hinge axis, and a second elongated portion connected to the first elongated portion to rotate about a first movable hinge axis, and to said pickup member to rotate with respect to the pickup member about a second movable hinge axis; electric actuating means being provided to rotate said first and said second elongated portion and said pickup member about said axes.

Said electric actuating means of the unit defined above preferably comprise a first and a second electric motor, and control means for controlling said motors independently of each other.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
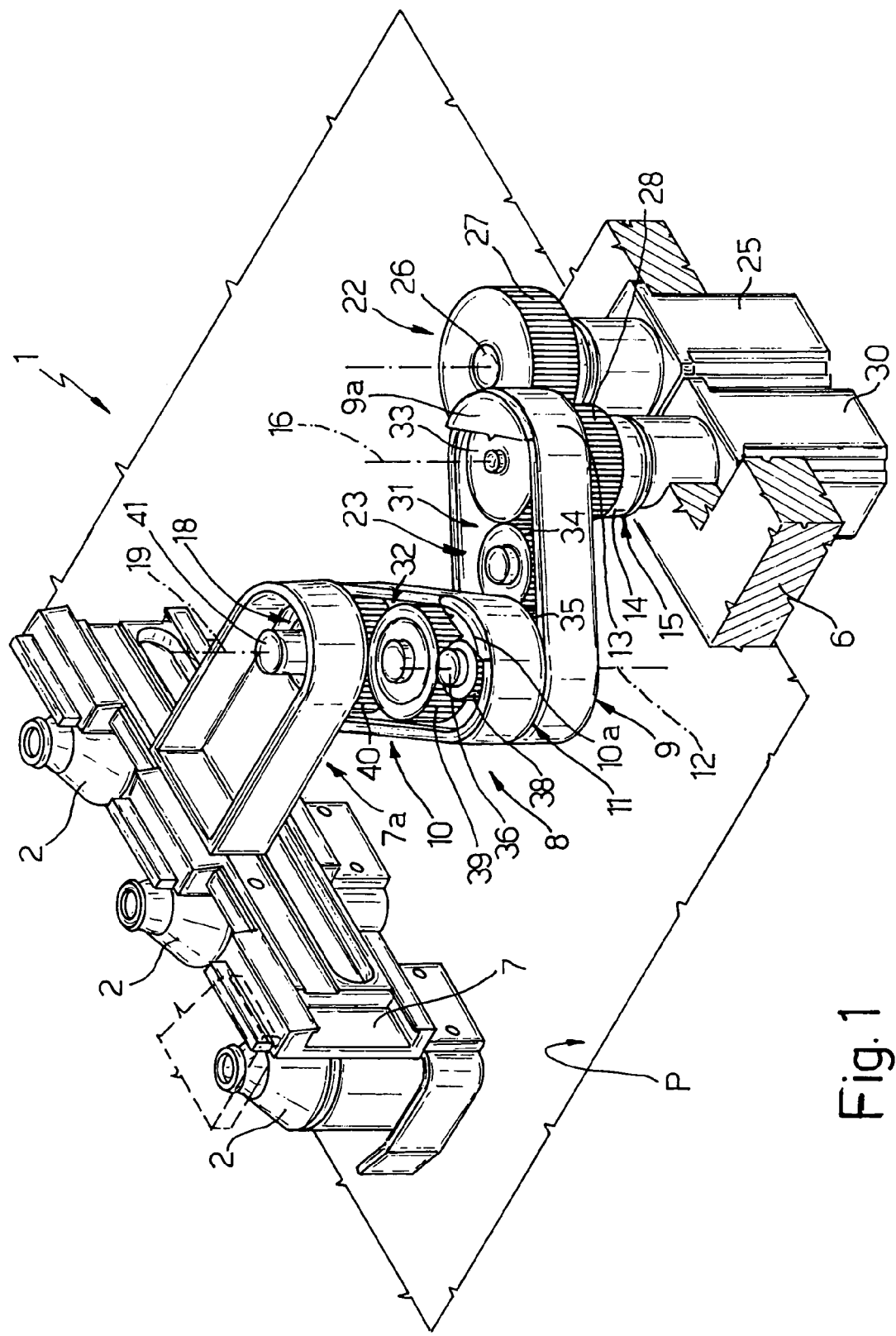
FIG. 1 shows a side view in perspective, with parts removed for clarity, of a preferred embodiment of the transfer unit according to the present invention.
Figure 2:
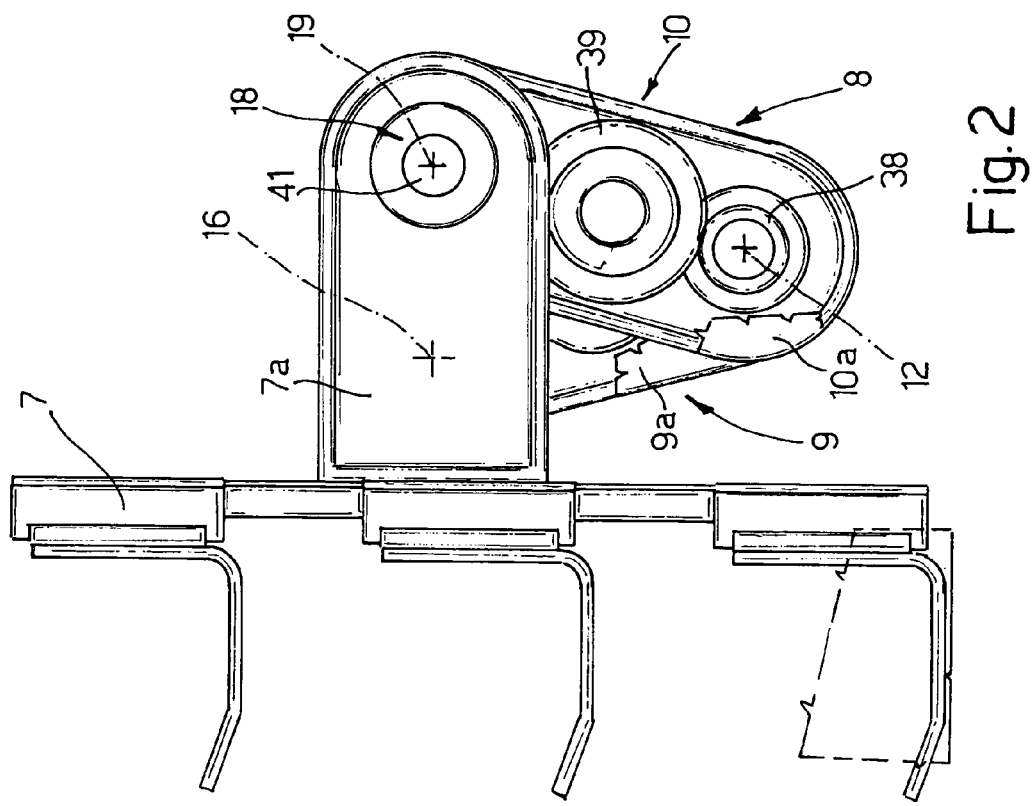
FIGS. 2 and 3 show plan views of the FIG. 1 unit in two different operating positions.
Figure 2:
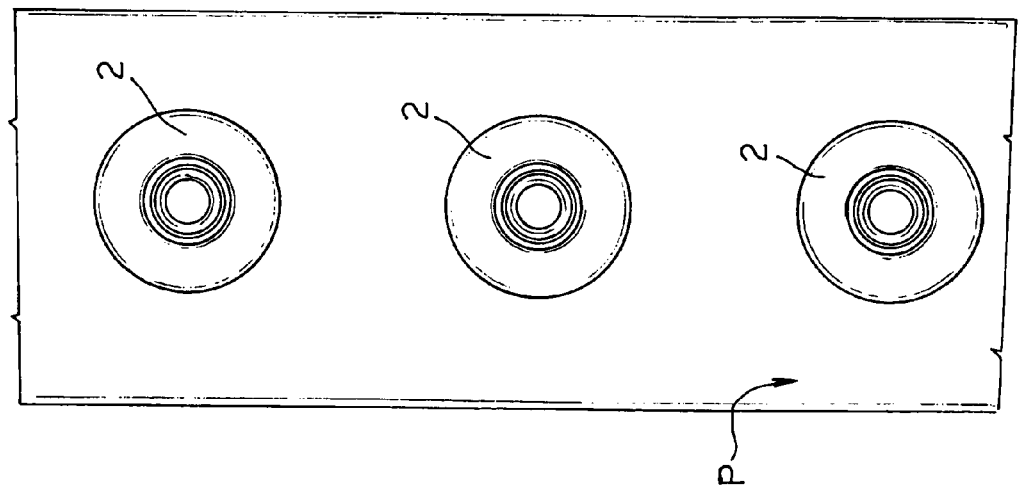
Figure 3:
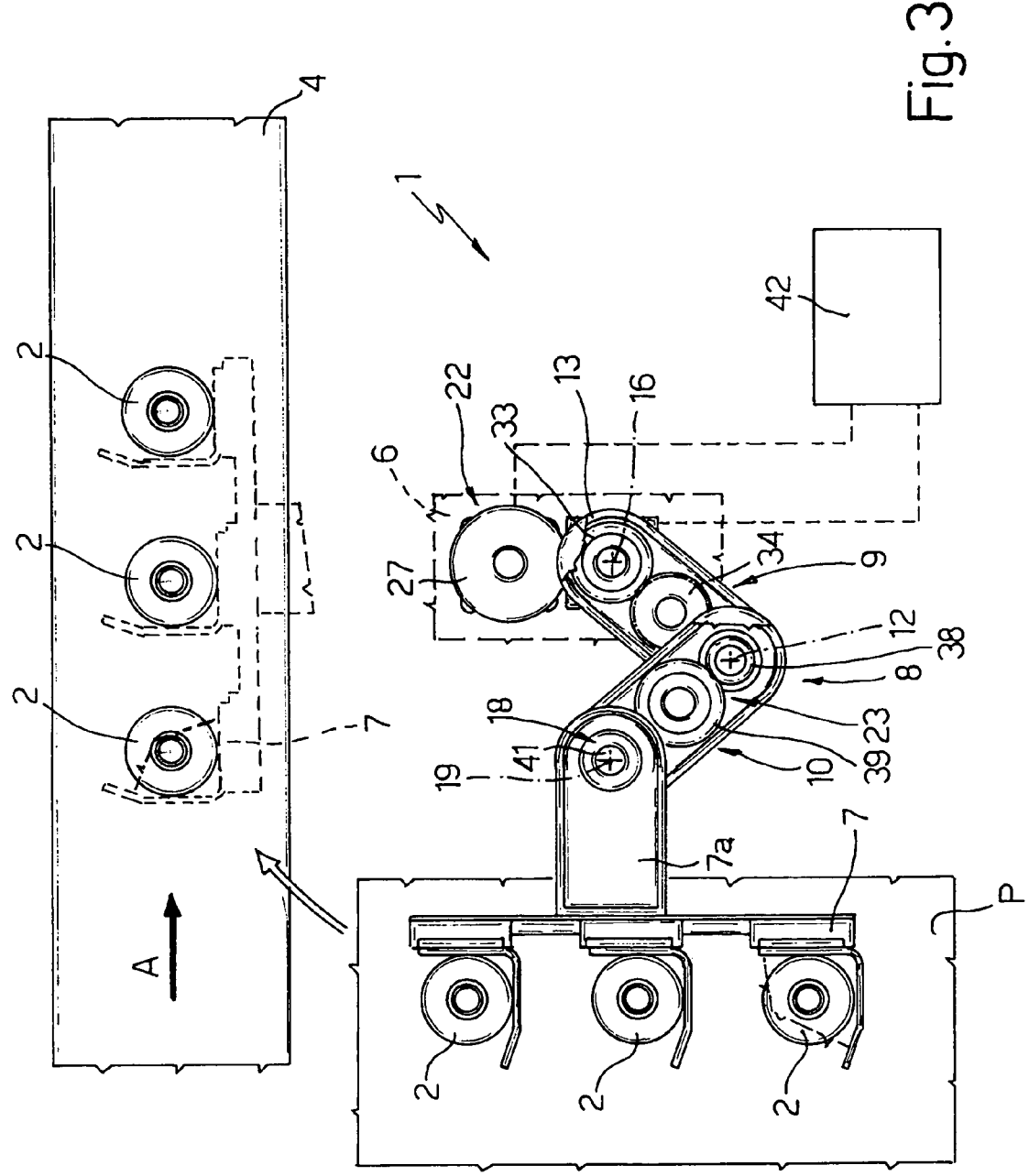

Number 1 in FIGS. 1 to 3 indicates as a whole a transfer unit for transferring glass articles 2 from a fixed supporting surface P to a belt conveyor 4 (FIG. 3) for conveying articles 2 in a direction A to an output of the molding system (not shown) on which articles 2 are molded.

Transfer unit 1 comprises a fixed supporting frame 6 extending beneath supporting surface P; a known pickup and moving member 7 for engaging articles 2 for transfer; and an actuating device 7a for activating pickup member 7. Device 7a comprises a single articulated arm 8 interposed between pickup member 7 and frame 6, and in turn comprising only two hollow elongated portions 9 and 10. Portions 9 and 10 extend parallel to and over supporting surface P, and are connected to each other by a hinge 11 to rotate, with respect to each other, about a movable hinge axis 12 perpendicular to surface P. With reference to FIG. 1, portion 9 comprises an end portion 13, opposite the end portion hinged to portion 10, from which projects downwards a tubular pin 14 connected integrally to end portion 13, and connected to frame 6 by a known hinge 15, not described in detail, to rotate in axially-fixed manner about a fixed hinge axis 16 coincident with the axis of pin 14 and perpendicular to surface P.

The end of arm 8 opposite the end hinged to frame 6 is fitted with pickup member 7, a projecting arm of which is connected by a known hinge 18 to an end portion of portion 10, opposite the end portion hinged to portion 9, to rotate in axially-fixed manner about a movable hinge axis 19 parallel to axes 12 and 16.

In the embodiment described, the distance between axes 12 and 16 equals the distance between axes 12 and 19, whereas, in a variation not shown, said distances differ.

Member 7 is moved by means of two separate, independent, powered actuating assemblies 22 and 23 forming part of device 7a. Assembly 22, in use, rotates portion 9 about axis 16 with respect to frame 6, extends entirely beneath supporting surface P, and comprises an electric motor reducer 25 connected to frame 6 with its output shaft 26 parallel to axis 16. Assembly 22 also comprises two meshing gears 27 and 28, of which gear 27 is fitted to shaft 26 of motor reducer 25, and gear 28 is fitted to pin 14 coaxially with axis 16.

Assembly 23 rotates portion 10 and pickup member 7 about axes 12 and 19, and comprises an electric motor reducer 30 fitted to frame 6, coaxially with axis 16 and adjacent to motor 25; and two gear trains 31 and 32 housed inside portions 9 and 10 respectively. Portions 9 and 10 are hollow portions closed on top by respective covers 9a and 10a (only shown partly in FIG. 1) to mechanically protect the respective gear trains inside. In the embodiment shown, gear train 31 comprises an input gear 33 fitted to the output shaft of motor reducer 30; an intermediate transmission gear 34; and an output gear 35 connected integrally to portion 10 and coaxial with axis 12. A pin 36, connected integrally to portion 9 and coaxial with axis 12, is fitted with an input gear or pinion 38 of gear train 32, which also comprises an intermediate gear 39, and an output gear 40 connected integrally to the arm of pickup member 7 and coaxial with axis 19. Gear train 32 provides for maintaining the arm of pickup member 7 aligned with the axis through axes 16 and 19 and parallel to surface P.

Motors 25 and 30 are connected electrically to a known control unit 42, which controls motors 25 and 30 independently to move pickup member 7 between a withdrawn rest position (shown in FIG. 2), and a forward release position (shown by the dash line in FIG. 3) via a pickup position (shown by the continuous line in FIG. 3) in which articles 2 are picked off supporting surface P. When the pickup member is in the rest position, axis 16 extends between axis 19 and articles 2 for pickup (FIG. 2), and axis 12 is located on the opposite side of axis 19 to conveyor 4.

As will be clear from the foregoing description, using a single articulated arm, transfer unit 1 as described is straightforward constructionwise and extremely compact, mainly due to arm 8 comprising only two mutually hinged portions, and to the portions themselves fully housing the transmission parts extending above the supporting surface. Using two independent motors for rotating different portions of arm 8, pickup and transfer member 7 can be set to a number of different, freely selectable pickup and release positions, thus obtaining a pickup and transfer unit which is adaptable not only to the size of articles 2 for transfer, but also to the arrangement of articles 2 both on the supporting surface and on carry-off conveyor 4. From the organization and maintenance standpoint, unit 1 provides for dispensing with dedicated pickup and moving units, until now indispensable in certain transfer conditions, as, for example, when forming two parallel lines of articles on the conveyor.

Moreover, using a single articulated arm and independent motors and transmissions, articles 2 can be transferred from the pickup area to the release area along variable trajectories, as opposed to compulsory, i.e. circular, trajectories as in known solutions. This provides for improving the stability and preventing detachment of the transferred articles, but above all for eliminating devices (e.g. air jets, etc.) normally required to hold the transferred articles on the pickup and moving member, i.e. to counteract the spin effect, thus simplifying and reducing the cost of the system. Using electric motors solves any problems posed, as in known solutions, by the use of pressurized operating fluids; and, being located beneath supporting surface P of articles 2, the electric motors operate in a much cooler environment than above the supporting surface, thus improving the reliability and extending the working life of the motors.

Clearly, changes may be made to pickup and transfer unit 1 as described herein without, however, departing from the scope of the present invention. In particular, arm 8 may comprise a different number of portions 9, 10, which may differ in size from and be connected to one another differently from those described; and motors 25 and 30 may be located differently from those shown, and may control the various parts of the arm by means of different mechanical transmissions. Finally, being located some distance from articles 2 for transfer, and therefore in cooler, less crowded areas than above the supporting surface, the motors may obviously be replaced with motors other than those indicated.

The invention claimed is:

1. A transfer unit for transferring glass articles from a supporting surface to a carry-off conveyor, the unit comprising:
   a fixed support;
   a pickup member for engaging the articles for transfer;
   actuating means for activating said pickup member, said actuating means comprising a single articulated arm comprising a first elongated portion hinged to said fixed support for rotating about a fixed hinge axis, a second elongated portion connected to the first elongated portion for rotating about a first movable hinge axis and to said pickup member for rotating with respect to the pickup member about a second movable hinge axis; and
   electric actuating means for rotating said first and said second elongated portion and said pickup member about said axes, said electric actuating means comprising first and second electric motors and a control means for controlling said electric motors independently of each other.

2. A unit as claimed in claim 1, wherein said electric motors are located beneath said supporting surface.

3. A unit as claimed in claim 2, wherein said electric motors are located adjacent to each other.

4. A unit as claimed in claim 1, wherein said electric actuating means also comprises a first mechanical transmission driven by said first electric motor to rotate said first elongated portion about said fixed hinge axis; and a second mechanical transmission driven by said second electric motor to rotate the first and second elongated portions with respect to each other about said first movable hinge axis and to rotate said pickup member with respect to said second portion about said second movable hinge axis.

5. A unit as claimed in claim 4, wherein said second mechanical transmission is housed entirely in said articulated arm.

6. A unit as claimed in claim 4, wherein said first mechanical transmission is located beneath said supporting surface.

7. A unit as claimed in claim 4, wherein said mechanical transmissions are gear transmissions.

8. A transfer unit for transferring glass articles from a supporting surface to a carry-off conveyor, the unit comprising:
   a fixed support;
   a pickup member for engaging the articles for transfer;
   actuating means for activating said pickup member, said actuating means comprising a single articulated arm comprising a first elongated portion hinged to said fixed support for rotating about a fixed hinge axis, a second elongated portion connected to the first elongated portion for rotating about a first movable hinge axis and to said pickup member for rotating with respect to the pickup member about a second movable hinge axis;
   first and second independently powered actuating assemblies for rotating said first and said second elongated portions and said pickup member about said axes; and
   a control means for controlling said first and second powered actuating assemblies independent from each other.

* * * * *